United States Patent [19]

Taub

[11] 3,890,351

[45] June 17, 1975

[54] LOWERALKYL ESTERS OF 3β-[TRI(LOWER ALKYL)SILYLOXY]-2α-(3-OXO OR HYDROXY-1-OCTENYL)-5-OXO-1β-CYCLOPENTANE-HEPTANOIC ACID, 5-CYCLIC ETHYLENE ACETAL

[75] Inventor: David Taub, Metuchen, N.J.

[73] Assignee: Merck & Co., Inc., Rahway, N.J.

[22] Filed: May 8, 1972

[21] Appl. No.: 251,726

[52] U.S. Cl. ........ 260/340.9; 260/343.5; 260/456 P; 260/464; 260/468 R; 260/468 D; 260/468 L; 260/514 D; 260/514 L; 260/617 R
[51] Int. Cl. ............................................. C07d 13/04
[58] Field of Search .................................. 260/340.9

[56] References Cited
UNITED STATES PATENTS
3,736,335   5/1973   Wendler et al. ................ 260/340.9

OTHER PUBLICATIONS
Taub et al., "Chemical Communications" 1970, pp. 1258–9.
McOmie, "Protective Groups in Organic Chemistry" (1973), Plenum Press, pages 103, 137.

Primary Examiner—Donald G. Daus
Assistant Examiner—Raymond V. Rush
Attorney, Agent, or Firm—David L. Rose; Thomas E. Arther; Rudolph J. Anderson, Jr.

[57] ABSTRACT

There is provided an improved process for the reduction of the 3-oxo group in the methyl ester of 3β-hydroxy-2α-(3-oxo-1-octenyl)-5-oxo-1β-cyclopentaneheptanoic acid, 5-cyclic ethylene acetal by first protecting the 3β-hydroxy substituent by derivatization with the 3β-[tri(loweralkyl)silyloxy]ether thereof, subsequently reducing said trimethylsilyloxy derivative with sodium borohydride to produce a mixture containing predominantly 3β-[tri(loweralkyl)silyloxy]-2α-(3α-hydroxy-1-octenyl)-5-oxo-1β-cyclopentaneheptanoic acid, 5-cyclic ethylene acetal methyl ester. There are also provided novel intermediates in the operation of the improved process.

5 Claims, No Drawings

3,890,351

LOWERALKYL ESTERS OF 3β-[TRI(LOWER ALKYL)SILYLOXY]-2α-(3-OXO OR HYDROXY-1-OCTENYL)-5-OXO-1β-CYCLOPENTANE-HEPTANOIC ACID, 5-CYCLIC ETHYLENE ACETAL

DETAILED DESCRIPTION OF THE INVENTION

Prostaglandin $E_1$, which may be depicted structurally as

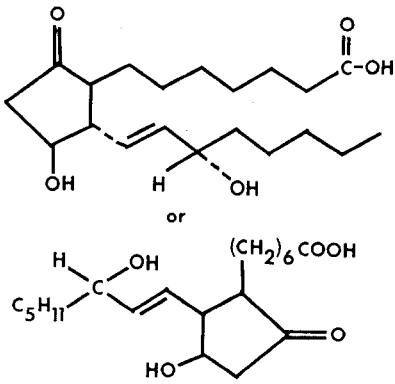

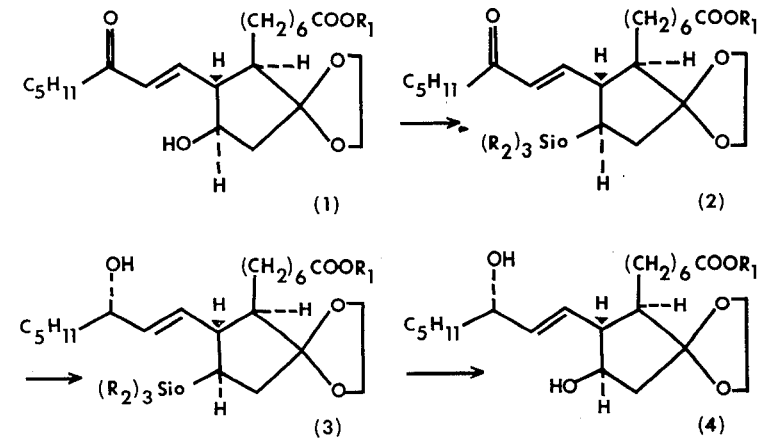

is one of a group of naturally occurring compounds known generally as prostaglandins. These prostaglandins have interesting and important biological activity, the precise biological properties varying with the individual members of the prostaglandin family, as described in the article Chemistry of Fats and Other Lipids, Vol. IX, Polyunsaturated Acids, Part 2, pp. 231–273, Pergamon Press (1968).

One of the more important prostaglandins is prostaglandin $E_1$, also known as $PGE_1$. It has an effect on the contractility of smooth muscle and is useful in the induction of labor in pregnant females and for the termination of pregnancies by therapeutic abortion, M.P. Embrey, British Medical Journal, 1970, 2, 256–258; 258–260. Other uses, besides stimulation of smooth muscle, are described in the literature and include the lowering of blood pressure, effect on the mobilization of free fatty acids from adipose tissue, and bronchodilating effects.

Heretofore, the supply of prostaglandin $E_1$, as well as of other prostaglandins, has been severely limited because only minute amounts of naturally occurring material are available, and partial biosynthesis by enzymes present in mammalian seminal vesicles has only afforded limited amounts of the products.

It is an object of this invention to improve the stereoselective synthesis of prostaglandin $E_1$, as described in U.S. Ser. No. 201,979, now U.S. Pat. No. 3,833,612. It is a further object of this invention to provide novel intermediate compound which in addition to being useful in the synthesis of optically active prostaglandin $E_1$, may itself exhibit prostaglandin-like activity. Other objects will become evident from the following description of the invention.

The novel process and intermediates of our invention is shown structurally in the following flow diagram, and immediately following the diagram, the chemical names of the compounds are set forth.

wherein $R_1$ and $R_2$ are each loweralkyl of from 1 to 6 carbon atoms which includes both straight and branched chains.

As a matter of convenience for understanding the foregoing flowsheet and the following description of the invention, there follows a list of names of the chemical compounds 1–4 inclusive.

3β-Hydroxy-2α-(3-oxo-1-octenyl)-5-oxo-1β-cyclopentaneheptanoic acid lower alkyl ester, 5-cyclic ethylene acetal.

3β[Tri(loweralkyl)silyloxy]-2α-(3-oxo-1-octenyl)-5-oxo-1β-cyclopentaneheptanoic acid loweralkyl ester, 5-cyclic ethylene acetal.

3β-[Tri(loweralkyl)silyloxy]-2α-(3α-hydroxy-1-octenyl)-5-oxo-1β-cyclopentaneheptanoic acid loweralkyl ester, 5-cyclic ethylene acetal.

3β-Hydroxy-2α-(3α-hydroxy-1-octenyl)-5-oxo-1β- cyclopentaneheptanoic acid loweralkyl ester, 5-cyclic ethylene acetal.

The preparation of racemic and optically active compound 1, and the precursors thereof (Preparations 1–26 below) as well as the reaction of compound 4 leading to racemic and optically active prostaglandin $E_1$, (Preparations 27 and 28 below) are described in pending U.S. Ser. Nos. 201,959 and 201,979, now U.S. Pat. No. 3,833,612, filed on Nov. 24, 1971. In addition, the above-identified serial number describes the process over which this is an improvement. Previously the reduction of the side chain carbonyl group of compound 1 was effected by employing a hydrogen atom of a loweralkanoyl group in place of the trialkyl silyoxy group. When such was the case, the results of the reduction afforded a mixture of the $3\alpha$ and $3\beta$ hydroxy groups on the side chain of compound 4 which was of equal of greater abundance in the undesired $3\beta$ isomer. This, after separation of the isomers, caused the yields of the desired $3\alpha$ isomer to be considerably reduced. By this improvement we have succeeded in improving the process such that the $3\alpha$ isomer is formed as the major product, and that, when the $3\alpha$ isomer is separated from the $3\beta$ isomer, much greater quantities of racemic or optically active compound 3 and subsequent intermediates are obtained; and, of course, greater quantities of the end product, prostaglandin $E_1$.

The starting material may be employed as the racemic or optically active compound. The above noted application provides for the synthesis of either. When the optically active form of compound 1 is employed, the optically active form of compound 4 is obtained, as the process described herein does not destroy any center of asymmetry or otherwise tend to racemize any of the compounds.

The process of this invention is carried out initially by preparing the trialkyl silyl ether of compound 1. This is accomplished by contacting the hydroxy compound (1) with a silylating reagent containing a trialkyl silyl group, preferably a trimethyl silyl group. This may be effected with reagents such as N,O-bis-trimethylsilyltrifluoroacetamide, N,O-bis-trimethylsilylamide, trimethylsilylimidazole, hexamethylsilazane and the like. A molar excess of the above reagents are generally combined in a tertiary amine such as triethyl amine or pyridine or in a mixture of said tertiary amine and an inert solvent such as benzene, tetrahydrofuran,, ether, and the like. Compound 1 is combined with the above reagents and the reaction mixture stirred for from 1 to 10 hours at a temperature of about 10° to 50°C. Room temperature is the preferred temperature. The silyl ether is isolated by techniques known to those skilled in this art. It has been found to be advantageous if a catalytic amount of trimethylsilyl chloride is employed in combination with any of the above listed silylating reagents. The trimethyl silyl chloride facilitates the reaction improving yields and reducing reaction times.

The silyl ether (compound 2) is reduced using a mild reducing agent such as an alkali metal borohydride. The reduction is generally complete in from 15 minutes to 2 hours at from about $-20°$ to 25°C. The reduction affords a mixture of the $3\alpha$ and $3\beta$ hydroxy isomers with, as previously described, the preferred $\alpha$ isomer predominating.

Following the reduction, the trimethyl silyl group must be removed affording compound 4. This is done by treating compound 3 at from about 20° to 100°C. for from about 10 minutes to 2 hours with an aqueous loweralkanol solution or other suitable mild hydrolizing agent. The product 4 can be isolated by techniques known to those skilled in this art and converted to the ultimate product, prostaglandin $E_1$, by processes described in the above-identified copending application.

The $3\alpha$- and $3\beta$-hydroxy isomers may be separated either before or after the removal of the trialkyl silyl group and is generally done using chromatographic techniques although other methods of isolation may also be employed such as fractional crystallization and the like. The desired $3\alpha$ isomer after isolation, is of course, used in any synthetic steps remaining in the synthesis of $PGE_1$. However, to increase the efficiency of the process, the undesired $3\beta$ isomer may also be isolated and back-oxidized using a mild oxidizing agent such as manganese dioxide, to afford the keto compound. If the back-oxidation is performed on compound 3, compound 2 will result and if performed on compound 4, compound 1 will result.

The following example is presented in order that the invention may be more fully understood. It is not to be construed as being limitative of the invention.

EXAMPLE

To 60 mg. of optically active natural series $3\beta$-hydroxy-$2\alpha$-(3-oxo-1-octenyl)-5-oxo-$1\beta$-cyclopentaneheptanoic acid methyl ester, 5-cyclic ethylene acetal having $\alpha_D$ $CHCl_3$ $+9°$ in 0.5 ml. of pyridine and 0.5 ml. of benzene is added 280 mg. of N,O-bistrimethylsilyltrifluoroacetamide containing 1% trimethylchlorosilane. After 2 hours at room temperature 2 ml. of xylene is added and the mixture is pumped to dryness. The residue consists of pure $3\beta$-(trimethylsilyoxy)-$2\alpha$-(3-oxo-1-octenyl)-5-oxo-$1\beta$-cyclopentaneheptanoic acid methyl ester, 5-cyclic ethylene acetal. The residue is cooled to $-10°C$. and 10 mg. of sodium borohydride dissolved in 1.5 ml. of methanol at 0 to $-10°C$. is added. The mixture is stirred at 0° to $-10°C$. for 35 minutes. The reaction mixture is then added to cold 10% aqueous sodium dihydrogen phosphate solution and extracted with ethyl acetate. An equal volume of benzene is added to the organic extract and the combined extracts are dried over sodium sulfate and the solvents removed under vacuum. The residue consists of $3\beta$-(trimethylsilyloxy) -$2\alpha$-(3$\alpha$-hydroxy-1-octenyl)-5-oxo-$1\beta$-cyclopentaneheptanoic acid methyl ester, 5-cyclicethylene acetal and its $2\alpha$-($3\beta$-hydroxy-1-octenyl) epimer. The residue is dissolved in 1.5 ml. of methanol and 1 ml. of water and the mixture kept for 20 minutes at 60°–90°C. Toluene is added and the mixture concentrated to dryness under vacuum affording $3\beta$-hydroxy-$2\alpha$-($3\beta$-hydroxy-1-octenyl)-5-oxo-$1\beta$-cyclopentaneheptanoic acid methyl ester, 5-cyclicethylene acetal and its $2\alpha$-($3\beta$-hydroxy-1-octenyl) epimer. Thin layer chromatography on silica gel coated glass plates (system - acetone: chloroform 1:1) shows the $2\alpha$-($3\alpha$-hydroxy-1-octenyl) isomer to predominate over the $2\alpha$-($3\beta$-hydroxy-1-octenyl) isomer. The two isomers are separated by chromatography on silica gel (dry column) eluting with acetone: chloroform (1:1) and are obtained in the ratio $3\alpha$:$3\beta$=2:1. The melting point of the $3\beta$-hydroxy-$2\alpha$-($3\alpha$-hydroxy-1-octenyl)-5-oxo-$1\beta$-cyclopentaneheptanoic acid methyl ester, 5-cyclicethylene acetal isomer is 48° to 51°C. The $2\alpha$-($3\beta$-hydroxy-1-octenyl) isomer is obtained as an oil and is back oxidized to the 3 keto group using manganese dioxide.

When in the above procedure racemic $3\beta$-hydroxy-$2\alpha$-(3-oxo-1-octenyl)-5-oxo-$1\beta$- cyclopentaneheptanoic acid methyl ester, 5-cyclicethylene acetal is employed in place of the optically active compound, racemic 3β-hydroxy-2α-(3α-hydroxy-1-octenyl)-5-oxo-1β-cyclopentaneheptanoic acid methyl ester, 5-cyclicethylene acetal is obtained, m.p. 54°–56°C.

The starting material for the instant invention, 3β-hydroxy-2α-(3-oxo-1-octenyl)-5-oxo-1β-cyclopentaneheptanoic acid methyl ester, 5-cyclicethylene acetal, can be prepared by the following series of preparative steps, numbered 1–26.

PREPARATION 1

3α-Methyl-4-cyclohexene-1α,2α-dimetanol

A solution of 25 g. of (±)-3α-methyl-4-cyclohexene-1α,3α-dicarboxylic anhydride in 140 ml. of dry tetrahydrofuran is added to a suspension of 10.5 g. of lithium aluminum hydride in 140 ml. of tetrahydrofuran at such a rate as to maintain a gentle reflux. When the addition is complete, the reaction mixture is refluxed for 3 hours and allowed to cool overnight. The complex is decomposed by the careful addition of 100 ml. of 1:1 tetrahydrofuran/water mixture to the reaction mixture at 0°C. 150 Ml. of chloroform is added, the reaction mixture is filtered, and the filter cake washed with chloroform. The combined filtrates are concentrated to dryness in vacuo. The residue is dissolved in benzene, dried with magnesium sulfate, and evaporated affording 22.4 g. of (±) 3α-methyl-4-cyclohexene-1α,2α-dimethanol as a colorless solid (m.p. 47°–49.5°).

When in the above procedure the resolved acid/ester (−) 3α-methyl-4-cyclohexene-1α,2α-dicarboxylic acid 1-methyl ester is employed in place of 3α-methyl-4-cyclohexene-1α,3α-dicarboxylic anhydride there is obtained (−) 3α-methyl-4-cyclohexene-1α,2α-dimethanol [$\alpha 9_D$ CHCl$_3$ −26°.

PREPARATION 2

3α-Methyl-4-cyclohexene-1α,2α-dimethanol-di-p-toluenesulfonate

To a solution of 10 g. (0.064 moles) of (±) 3α-methyl-4-cyclohexene-1α,2α-dimethanol in 30.4 g. of dry pyridine at −15°C. is added 26.83 g. (0.141 moles, 10% escess) of recrystallized p-toluenesulfonylchloride in portions at such a rate that the temperature does not exceed −5°. The reaction mixture is stirred for 2 hours at −15° and stored overnight at 4°C. The reaction mixture is then poured slowly onto 250 cc of an ice/water mixture with stirring. The aqueous mixture is aged at 0° to 5°C. for 20 minutes and the aqueous layer decanted from the semi-solid precipitate. The solid material is dissolved in chloroform and the chloroform solution is washed with dilute hydrochloric acid at 0°C., water, dilute aqueous potassium bicarbonate, water again, and finally with saturated aqueous sodium chloride. The chloroform solution is dried with magnesium sulfate and evaporated to dryness affording 27.7 g. of a viscous oil which crystallizes on dilution with ether. The product, (±) 3α-methyl-4-cyclohexene-1α,2α-dimethanol-di-p-toluene-sulfonate has a m.p. 62.5°–65°C.

When in the above procedure (−) 3α-methyl-4-cyclohexene-1α,2α-dimethanol is employed in place of the racemic mixture there is obtained (−) 3α-methyl-4-cyclohexene-1α,2α-dimethanol di-p-toluene sulfonate, m.p. 52°–54°C. [$\alpha$]$_D$ CHCl$_3$ −12°.

PREPARATION 3A

3α-Methyl-4-cyclohexene-1α,2α-diacetonitrile

A suspension of 1 g. of sodium cyanide and 10 ml. of dried dimethylsulfoxide is heated under nitrogen to 80°–85°C. 2.37G. of (±) 3α-methyl-4cyclohexene-1α,2α-dimethanol di-p-toluenesulfonate is added in 3 portions over 15 minutes and the reaction mixture heated at 90°–95°C. for 18 hours. The reaction mixture is cooled and diluted with 6 volumes of saturated sodium chloride solution. The aqueous mixture is extracted with methylene chloride, dried with magnesium sulfate, and evaporated to dryness in vacuo affording 0.781 g. of (±) 3α-methyl -4-cyclohexene-1α,2α-diacetonitrile which is obtained as an oil.

PREPARATION 3B

3α-Methyl-4-cyclohexene-1α,2α-diacetonitrile

A suspension of 14.7 g. of sodium cyanide and 140 ml. of dried dimethylsulfoxide is heated under nitrogen to 80°–85°C. 27.7 G. of (±) 3α-methyl-4-cyclohexene-1α,2α-dimethanol di-p-toluenesulfonate is added in 3 portions over 15 minutes and the reaction mixture heated at 90°–95°C. for 18 hours. The reaction mixture is cooled and diluted with 6 volumes of saturated sodium chloride solution. The aqueous mixture is extracted with methylene chloride; the extracts washed with saturated sodium chloride, dried with magnesium sulfate, and evaporated to dryness in vacuo affording 10.04 g. (96%) of (±) 3α-methyl-cyclohexene-1α,2α-diacetonitrile which is obtained as an oil.

When in the above procedure (−) 3α-methyl-4-cylcohexene-1α,2α-dimethanol di-p-toluenesulfonate is employed in place of the racemic mixture there is obtained (−) 3α-methyl-4-cyclohexene-1α,2α-diacetonitrile which is obtained as an oil.

PREPARATION 4

3α-Methyl-4-cyclohexene-1α,2α-diacetic acid 81.7 G. of (±) 3α-methyl-4-cyclohexene-1α,2α-diacetonitrile is suspended in 700 ml. of 33% aqueous potassium hydroxide and refluxed for 7 hours. After standing overnight at room temperature, the reaction mixture is treated with charcoal, extracted with ether, and acidified with concentrated HCl affording a solid precipitate weighing 92 g. The solid material is recrystallized from acetone/ethylacetate affording 67 g. of (±) 3α-methyl-4-cyclohexene-1α,2α-diacetic acid, m.p. 148°–151°C.

When in the above procedure (−) 3α-methyl-4-cyclohexene-1α,2α-diacetonitrile is employed in place of the racemic mixture, there is obtained (−) 360 -methyl-4-cyclohexene-1α,2α-diacetic acid, m.p. 98.5°–100°C., [$\alpha$]$_D$CHCl$_3$, −55°.

PREPARATION 5

4α-Hydroxy-5β-iodo-3α-methyl-1α,2α-cyclohexanediacetic acid δ-lactone 12.8 G. of (±) 3α-methyl-4-cyclohexene-1α,2α-diacetic acid is dissolved in 150 ml. of water containing 36 g. of potassium bicarbonate. A solution of 30.68 g. of iodine and 65.21 g. of potassium iodide in 181 ml. of water is added with stirring. The reaction mixture is stirred for 3.5 hours in the dark, decolorized with saturated aqueous sodium bisulfite, acidified with 2.5N hydrochloric acid, and extracted with ethyl acetate. The extracts are washed with an aqueous saturated sodium chloride solution containing a small amount of sodium bisulfite, and evaporated to dryness affording 20.04 g. of (±) 4α-hydroxy-5β-iodo-3α-methyl-1α,2α-cyclohexanediacetic acid δ-lactone m.p. 150°–152°C.

When in the above procedure (−) 3α-methyl-4-cyclohexenediacetic acid is employed in place of the racemic mixture, there is obtained (−) 4α-hydroxy-5β-iodo-3α-methyl-1α,2α-cyclohexanediacetic acid δ-lactone, m.p. 170° (dec) [α]$_D$CHCl$_3$ −3°.

PREPARATION 6

4α-Hydroxy-5β-diodo-3α-methyl-1α,2α-cyclohexanediacetic acid δ-lactone methyl ester 10.0 G. of (±) 4α-hydroxy-5β-iodo-3α-methyl-1α,2α-cyclohexanediacetic acid δ-lactone is dissolved in the minimum amount of methanol and cooled to 0°C Ethereal diazo methane is added dropwise maintaining the temperature at 10°C. or less until a yellow color persists in the reaction medium. The solvents are evaporated in vacuo and the residue recrystallized from ethanol affording (±) 4α-hydroxy-5β-iodo-3-methyl-1α,2α-cyclohexanediacetic acid δ-lactone methyl ester m.p. 80°–82°C.

When in the above procedure (−) 4α-hydroxy-5β-iodo-3α-methyl-1α,2α-cyclohexanediacetic acid δ-lactone is employed in place of the racemic mixture, there is obtained optically active 4α-hydroxy-5β-iodo-3αmethyl-1α,2α-cyclohexanediacetic acid δ-lactone, methyl ester as an oil.

PREPARATION 7

4α-Hydroxy-3α-methyl-1α,2α-cyclohexanediacetic acid methyl ester, δ-lactone

To 68 G. of freshly prepared chromium diacetate dispersed in 250 ml. of dry dimethylsulfoxide containing 40 ml. of ethylmercaptan is added a solution of 20 g. of (±) 4α-hydroxy-5β-iodo-3α-methyl-1α,2α-cyclohexanediacetic acid δ-lactone methyl ester in 60 ml. of dimethylsulfoxide over 10 minutes. The reaction mixture is stirred at room temperature for 1 ¼ hours and diluted with 600 ml. of ice water. The reaction mixture is acidified with 250 ml. of 2.5N hydrochloric acid. The solution is further diluted with 600 ml. of water and extracted with methylene-chloride. The combined extracts are washed with water until the extracts are colorless and then washed with saturated sodium chloride solution. The organic layer is dried with magnesium sulfate and evaporated to dryness. The residue is recrystallized from benzene affording 12.5 g. of (±) 4α-hydroxy-3α-methyl-1α,2α-cyclohexanediacetic acid methyl ester δ-lactone m.p. 83°–84°C.

When in the above procedure (−) 4α-hydroxy-5β-iodo-3α-methyl-1α,2α-cyclohexanediacetic acid, δ-lactone, methyl ester is employed in place of the racemic mixture there is obtained (−) 4α-hydroxy-3α-methyl-1α,2α-cyclohexanediacetic acid methyl ester, δ-lactone as an oil [α]$_D$ CHCl$_3$ −48°.

PREPARATION 8

4α-Hydroxy-3α-methyl-1α,2α-cyclohexanediacetic acid δ-lactone

32 G. (0.14 moles) of (±) 4αhydroxy-3α-methyl-1α,2α-cyclohexanediacetic acid methyl ester, δ-lactone is saponified by stirring under nitrogen at room temperature for 1 hour with 15.84 g. (0.28 moles) of potassium hydroxide in 283 ml. of water. The resulting solution is extracted with ether, acidified with 2.5N hydrochloric acid, and extracted with ethyl acetate. The combined extracts are washed with aqueous Na$_2$S$_2$O$_3$ solution, and saturated sodium chloride solution, and dried over magnesium sulfate. The organic solutin is evaporated to dryness affording 27.52 g. of (±) 4α-hydroxy-3α-methyl-1α,2α-cyclohexanediacetic acid δ-lactone m.p. 135°–139°. Following recrystallization from an acetone/ether mixture, the m.p. is raised to 138°–140°C.

When in the above procedure (−) 4α-hydroxy-3α-methyl-1α,2α-cyclohexanediacetic acid methyl ester, δ-lactone is employed in place of the racemic mixture there is obtained (−) 4α-hydroxy-3α-methyl-1α,2α-cyclohexanediacetic acid, δ-lactone m.p. 118°–120.5°C., [α]$_D$ CHCl$_3$ −55°.

PREPARATION 9

4α-Hydroxy-3α-methyl-1α,2α-cyclohexanediacetic acid

A mixture of 7.0 g. of (±) 4α-hydroxy-3α-methyl-1α,2α-cyclohexanediacetic acid δ-lactone in 70 ml. of water with 14 g. of potassium hydroxide is heated on a steam bath under nitrogen for 2.5 hours. The gaseous carbon dioxide is passed through the solution until the pH is 8.0. The reaction mixture is then acidified to a pH of 2 with dilute hydrochloric acid and extracted with ethyl acetate affording 8.32 g. of (±) 4α-hydroxy-3α-methyl-1α,2α-cyclohexanediacetic acid m.p. 151°–153°C.

When in the above procedure (−) 4α-hydroxy-3α-methyl-1α,2α-cyclohexanediacetic acid, δ-lactone is employed in place of the racemic mixture, there is obtained (−) 4α-hydroxy-3α-methyl-1α,2α-cyclohexanediacetic acid [α]$_D$ CHCl$_3$ −66°.

PREPARATION 10

4α-Hydroxy-3α-methyl-1α,2α-cyclohexanediacetic acid dimethyl ester

Following the procedure of Preparation 6 employing 10.0 g. of (±) 4α-hydroxy-3α-methyl-1α,2α-cyclohexanediacetic acid there is obtained (±) 4α-hydroxy-3α-methyl-1α,2α-cyclohexanediacetic acid dimethyl ester.

When in the above procedure (−) 4α-hydroxy-3α-methyl-1α,2α-cycloehxanediacetic acid is employed in place of the racemic mixture there is obtained (−) 4α-hydroxy-3α-methyl-1α,2α-cyclohexanediacetic acid dimethyl ester.

PREPARATION 11

4α-Hydroxy-3α-methyl-1α,2α-cyclohexanediacetic acid dimethyl ester methanesulfonate To a stirred solution of 28.95 ml. of methane sulfonyl chloride in 50 ml. of dry pyridine at 0°C. is added a solution of 11 g. of 4α-hydroxy-3α-methyl-1α,2α-cyclohexanediacetic acid dimethyl ester in 86 ml. of dry pyridine dropwise. The reaction mixture is stirred for ½ hour at 0°C. and allowed to stand overnight at 0°C. The reaction is poured onto ice-water and extracted with chloroform. The combined extracts are acidified with dilute HCl at 0°C. and washed with water, potassium bicarbonate solution, water, and saturated sodium chloride solution. The organic layer is dried with magnesium sulfate and evaporated to dryness affording 14.4 g. of 4α-hydroxy-3α-methyl-1α,2α-cyclohexanediacetic acid dimethyl ester methanesulfonate obtained as an oil.

PREPARATION 12

3-Methyl-3-cyclohexene-1α,2α-diacetic acid dimethyl ester

A solution of 14 g. of 4α-hydroxy-3α-methyl-1α,2α-cyclohexanediacetic acid dimethyl ester methanesulfonate is 168 ml. of dry dimethyl sulfoxide is heated at 102°–104°C. under nitrogen with stirring for 6 ¼ hours. The reaction mixture is cooled, combined with ice water, and extracted with hexane. The combined extracts are washed successively with 4 portions of water and 1 portions of saturated sodium chloride solution. The hexane layer is dried with magnesium sulfate and evaporated to dryness in vacuo affording 8.5 g. of (±) 3-methyl-3-cyclohexene-1α,2α-diacetic acid dimethyl ester obtained as an oil.

PREPARATION 13

3-Methyl-3-cyclohexene-1α,2α-diacetic acid dimethyl ester 7.667 of (±) 4α-hydroxy-3α-methyl-1α,2α-cyclohexanediacetic acid dimethyl ester in 16 ml. of dry benzene is added dropwise, at 0°, to a stirred solution of 3.95 g. of methanesulfonyl chloride in 77 ml. of dry pyridine. After storing the mixture overnight at 0°, it is stirred at room temperature for 6 hours followed by heating at 100°–105° for 16 hours. The mixture is well chilled, diluted with hexane and acidified to pH with 6N hydrochloric acid. After separation of the two phases the aqueous layer is reextracted with hexane-benzene mixture. The combined extracts are washed with water, potassium bicarbonate solution, and saturated sodium chloride solution, and dried over magnesium sulfate. The solution is evaporated to dryness affording 6.78 g. of (±) 3-methyl-3-cyclohexene-1α,2α-diacetic acid dimethyl ester as an oil.

When in Preparations 11 and 13 (−) 4α-hydroxy-3α-methyl-1α,2α-cyclohexanediacetic acid, dimethyl ester is employed in place of the racemic mixture there is obtained (−) 3-methyl-3-cyclohexene-1α,2α-diacetic acid dimethyl ester as an oil.

PREPARATION 14

3-Methyl-3-cyclohexene-1α,2α-diacetic acid a mixture of 0.2403 g. of (±) 3-methyl-3-cyclohexene-1α,2α-diacetic acid dimethyl ester, 2 ml. of methanol, 2.5 ml. of water, and 0.48 g. of potassium hydroxide is stirred under nitrogen at room temperature overnight. Excess methanol is removed in vacuo and the basic aqueous medium extracted with ether, cooled, acidified with 2.5N hydrochloric acid, to pH 4 salted out, and extracted with ethyl acetate. Combined extracts after washing with saturated sodium chloride solution, drying over magnesium sulfate and evaporating to dryness afforded 0.1894 g. of solid acid, which on recrystallization from ether-hexane mixture had m.p. 121°–122.5°C.

When in the above procedure (−) 3-methyl-4-cyclohexane-1α,2α-diacetic acid, dimethyl ester is employed in place of the racemic mixture there is obtained (−) 3-methyl-3-cyclohexene-1α,2α-diacetic acid m.p. 102.5°–104°C. [α]$_D$ CHCl$_3$ −99.6°.

The above (±) or (−) diacid is converted to the corresponding diester using the procedure of Preparation 6.

PREPARATION 15

3α,6,7,7α-Tetrahydro-1α-(methoxycarbonyl) 4-methyl-2-oxoindaneheptanoic acid methyl ester Under an anhydrous and inert atmosphere 36.83 ml. of 0.565 M potassium-t-butoxide in dry t-butanol is evaporated to a white powdery residue under reduced pressure. The dry powder is dispersed in 50 ml. of dry xylene. 5 G. of (±) 3-methyl-3-cyclohexene-1α,2α-diacetic acid dimethyl ester in 40 ml. of exylene is added to the above dispersion dropwise. The reaction mixture is brought to reflux with the simultaneous removal by distillation of the lower boiling components. Refluxing at the temperature of boiling xylene is then continued for 2 hours. 45 Ml. of excess xylene is distilled off and 6.18 g. (10% molar excess) of methyl-7-iodoheptanoate in 5 ml. of xylene is added. The reaction mixture is refluxed for 16 hours, cooled, and diluted with benzene. Solid potassium iodide is removed by filtration recovering 99% of theory. The clear organic filtrate is washed with saturated sodium chloride, dried over magnesium sulfate, and evaporated to dryness affording 7.3 g. of 3α,6,7,7α-tetrahydro-1α-(methoxycarbonyl)-4-methyl-2-oxoindaneheptanoic acid methyl ester which is used as is in the next reaction.

When in the above procedure (−) 3-methyl-3-methyl-3-cyclohexene-1α,2α-diacetic acid dimethyl ester is employed in place of the racemic mixture there is obtained (−) 3α,6,7, 7α-tetrahydro-1α-(methoxycarbonyl)-4-methyl-2-oxoindaneheptanoic acid methyl ester.

PREPARATION 16

3α,6,7,7α-Tetrahydro-4-methyl-2-oxo-1β-indaneheptanoic acid methyl ester

A stirred mixture of 7.3 g. of (±) 3α,6,7,7α-tetrahydro-1α-(methoxycarbonyl-4-methyl-2-oxoindaneheptanoic acid methyl ester and 21.27 g. of lithium iodide dihydrate in 120 ml. of s-collidine under a nitrogen atmosphere is refluxed for 11 hours. The reaction mixture is evaporated and concentrated in a high vacuum to remove the s-collidine. The residue is dispersed in ethyl acetate and acidified with 2.5N hydroxhloric acid and salted out with solid sodium chloride. The organic layer is separated and washed with saturated sodium chloride solution. The combined aqueous layers are reextracted with ethyl acetate and the combined ethyl acetate extracts dried over a magnesium sulfate affording the heptanoic acid intermediate. The acid is dissolved in a minimum amount of methanol and treated with excess ethereal diazomethane as in Preparation 6 affording 6.5 g. of (±) 3α,6,7,7-α-tetrahydro-4-methyl-2-oxo-1β-indaneheptanoic acid methyl ester.

When in the above procedure (−) 3α,6,7,7α-tetrahydro-1α-(methoxycarbonyl)-4-methyl-2-oxoindaneheptanoic acid, methyl ester is employed in place of the racemic mixture there is obtained (+) 3α,6,7,7α-tetrahydro-4-methyl-2-oxo-1β-indaneheptanoic acid, methyl ester [α]$_D$ CHCl$_3$ +11.6°.

PREPARATION 17

3α,6,7,7α-Tetrahydro-4-methyl-2-oxo-1β-indaneheptanoic acid methyl ester, 2-cyclicethylene acetal A mixture of 11.8 g. of (±) 3α,6,7,7α-tetrahydro-4-methyl-2-oxo-1β-indaneheptanoic acid methyl ester, 27 ml. of ethylene glycol and 300 mg. of p-toluene sulfonic acid mono-hydrate in 600 ml. of benzene is refluxed with stirring for 18 hours using a Deam-Stark trap to separate the water formed in the reaction. The reaction mixture is cooled and added to 300 ml. of cold 5% potassium bicarbonate. The layers are separated and the aqueous layer extracted twice with 2:1 benzene-hexene. The combined organic fractions are washed 3 times with saturated aqueous sodium chloride, dried over sodium sulfate and evaporated to dryness affording 12.6 g. of (±) 3α,6,7,7α-tetrahydro-4-methyl-2-oxo-1β-indaneheptanoic acid methyl ester, 2-cyclicethylene acetal; nmr $(C_6D_6)\delta 3.56$ [4H-ethylene group].

When in the above procedure (+) 3α,6,7,7α-tetrahydro-4-methyl-2-oxo-1β-indaneheptanoic acid methyl ester $[\alpha]_D$ CHCl$_3$ +11.6° is employed in place of the racemic mixture there is obtained optically active 3α,6,7,7α-tetrahydro-4-methyl-2-oxo-1β-indaneheptanoic acid methyl ester, 2-cyclic acetal $[\alpha]_D$ CHCl$_3$ −26°.

PREPARATION 18

3β-Acetyl-2α-(2-methoxycarbonylethyl)-5-oxo-1β-cyclopentaneheptanoic acid methyl ester, 5-cyclicethylene acetal A. 3-Acetyl-2α-(2-carboxyethyl)-5-oxo-1β-cyclopentaneheptanoic acid methyl ester, 5-cyclicethylene acetal To a stirred solution of 5.69 g. of (±) 3α,6,7,7α-tetrahydro14-methyl-2-oxo-1β-indaneheptanoic acid methyl ester, 2-cyclicethylene acetal in 410 ml. of t-butanol and 11 ml. of water is added a mixture of 5.80 g. of potassium carbonate, 22.8 g. of sodium periodate, and 270 mg. of potassium permanganate in 1230 ml. of water. The reaction mixture is stirred at 20°–25°C. for 20 hours and concentrated in vacuo to remove the t-butanol. Ethylene glycol (0.5 ml.) is added and the reaction mixture extracted with 1:1 etherbenzene to remove neutral material. The aqueous layer is acidified with solid sodium dihydrogen phosphate and extracted 4 times with 1:1 ethyl acetate-benzene. The organic layer is dried over sodium sulfate and evaporated to dryness in vacuo affording (±) 3-acetyl-2α-(2-carboxyethyl)-5-oxo-1β-cyclopentaneheptanoic acid methyl ester, 5-cyclicethylene acetal as a mixture of the 3α and 3β isomers.

B. 3β-Acetyl-2α-(2-methoxycarbonylethyl)-5-oxo-1β-cyclopentaneheptanoic acid methyl ester, 5-cyclicethylene acetal The above (±) 3-acetyl-2α-(2-carboxyethyl)-5-oxo-1β-cyclopentaneheptanoic acid methyl ester, 5-cyclicethylene acetal is dissolved in 10 ml. of ether and treated with etheral diazomethane until an excess is present as indicated by a persistent yellow color. After 5 minutes the reaction mixture is evaporated to dryness in vacuo and the residue dissolved in 20 ml. of methanol and 2 ml of 1N sodium methoxide in methanol is added. The reaction mixture is stirred for 18 hours at room temperature and added to cold saturated aqueous sodium dihydrogen phosphate. The methanol is removed in vacuo and the mixture extracted with 1:1 ethyl acetate-benzene. The organic extract is dried over sodium sulfate and evaporated to dryness affording (±) 3β-acetyl-2α-(2-methoxycarbonylethyl)-5-oxo-1β-cyclopentaneheptanoic acid methyl ester, 5-cyclicethylene acetal, nmr (CDCl$_3$) $\delta 2.13$ [3H—CH$_3$CO].

When in the above procedures (−) 3α,6,7,7α-tetrahydro-4-methyl-2-oxo-1β-indaneheptanoic acid methyl ester, 2-cyclicethylene acetal is employed in place of the racemic compound there is obtained (+) 3β-acetyl-2α1(2-methoxycarbonylethyl)-5-oxo-1β-cyclopentaneheptanoic acid, methyl ester, 5-cyclicethylene acetal, $[\alpha]_D$ CHCl$_3$ +6.8°.

PREPARATION 19

3β-Acetoxy-2α-(2-methoxycarbonylethyl)-5-oxo-1β-cyclopentaneheptanoic acid methyl ester, 5-cyclicethylene acetal 60 G. of solid disodium monohydrogen phosphate is added to a stirred solution of 4.50 g. of (±) 3β-acetyl-2α-(2-methoxycarbonylethyl)-5-oxo-1β-cyclopentaneheptanoic acid methyl ester, 5-cyclicethylene acetal in 25 ml. of methylene chloride and the mixture cooled to 0°C. 45 Ml. of freshly prepared 0.3M trifluoroperacetic acid in methylene chloride is added and the reaction mixture stirred for 18 hours at room temperature. A thin layer chromatogram of an alquot portion of the reaction mixture indicates the reaction to be about 60% complete. An additional 40 ml. of the 0.3M trifluoroperacetic acid in methylene chloride is added. After stirring an additional 24 hours the reaction is complete. The reaction is filtered, the precipitate washed with methylene chloride and the combined filtrates washed with cold aqueous potassium iodide and cold aqueous sodium thiosulfate to remove residual peracid. The organic extract is washed with water, dilute aqueous potassium bicarbonate and saturated aqueous sodium chloride. The organic layer is dried over sodium sulfate and evaporated to dryness in vacuo affording (±) 3β-acetoxy-2α-(2-methoxycarbonylethyl)-5-oxo-1β-cyclopentaneheptanoic acid methyl ester, 5-cyclicethylene acetal as a colorless oil, nmr (CDCl$_3$)$\delta 2.01$ [3H—CH$_3$COO].

When in the above procedure (+) 3β-acetyl-2α-(2-methoxycarbonylethyl)-5-oxo-1β-cyclopentaneheptanoic acid methyl ester, 5-cyclicethylene acetal is employed in place of the racemic mixture there is obtained optically active 3β-acetoxy-2α-(2-methoxycarbonylethyl)-5-oxo-1β-cyclopentaneheptanoic acid methyl ester, 5-cyclicethylene acetal, of the natural series.

PREPARATION 20

2α-(2-Carboxyethyl)-3β-hydroxy-5-oxo-1β-cyclopentaneheptanoic acid methyl ester, δ-lactone, 5-cyclicethylene acetal A. 2α-(2-Methoxycarbonylethyl)-3β-hydroxy-5-oxo-1β-cyclopentaneheptanoic acid methyl ester, 5-cyclicethylene acetal 6 Ml. of 1.00N sodium methoxide is added to a stirred solution of 4.25 g. of (±) 3β-acetoxy-2α-(2-methoxy-carbonylethyl)-5-oxo-1β-cyclopentaneheptanoic acid methyl ester, 5-cyclicethylene acetal in 25 ml. of methanol under a nitrogen atmosphere and stirred at room temperature for 2 hours. The reaction mixture is poured into excess cold saturated aqueous sodium dihydrogen phosphate and extracted with 1:1 ethyl acetate-benzene. The organic extract is dried over sodium sulfate and evaporated to dryness in vacuo. The residue is purified chromatographically employing 180 g. of silica gel and cluting with 25% acetone in chloroform affording pure (±)

2α-(2-methoxycarbonylethyl)-3β-hydroxy-5-oxo-1β-cyclopentaneheptanoic acid methyl ester, 5-cyclicethylene acetal.

When in the above procedure optically active 3β-acetoxy-2α-(2-methoxycarbonylethyl)-5-oxo-1β-cyclopentaneheptanoic acid methyl ester, 5-cyclicethylene acetal of the natural series is employed in place of the racemic mixture there is obtained (+) 2α-(2-methoxycarbonylethyl)-3β-hydroxy-5-oxo-1β-cyclopentaneheptanoic acid methyl ester, 5-cyclicethylene acetal $[\alpha]_D$ CHCl$_3$ +14.7°.

B.  2α-(2-carboxyethyl)-3β-hydroxy-5-oxo-1β-cyclopentaneheptanoic acid methyl ester, δ-lactone, 5-cyclicethylene acetal 1.66 G. of (±) 2α-(2-methoxycarbonylethyl)-3β-hydroxy-5-oxo-1β-cyclopentancheptanoic acid methyl ester, 5-cyclicethylene acetal is dissolved in 350 ml. of benzene in a nitrogen atmosphere and rendered anhydrous by removing 30 ml. of benzene by distillation. 0.25 Ml. of 0.66M potassium t-butoxide in t-butanol is added and an additional 140 ml. of benzene removed by distillation over a period of 4 hours. The reaction mixture is cooled, added to cold saturated aqueous sodium dihydrogen phosphate, and extracted with benzene. The combined organic layers are washed with saturated aqueous sodium chloride, dried over sodium sulfate, and evaporated to dryness in vacuo affording (±) 2α-(2-carboxyethyl)-3β-hydroxy-5-oxo-1β-cyclopentaneheptanoci acid methyl ester, δ-lactone, 5-cyclicethylene acetal as a pale yellow oil.

When in the above procedure (+) 2α-(2-methoxycarbonylethyl)3β-hydroxy-5-oxo-1β-cyclopentaneheptanoic acid methyl ester, 5-cyclicethylene acetal is employed in place of the racemic mixture there is obtained optically active 2α-(2-carboxyethyl)-3β-hydroxy-5-oxo-1β-cyclopentaneheptanoic acid methyl ester, δ-lactone, 5-cyclicethylene acetal of the natural series.

PREPARATION 21

2α-(2-Carboxy-2-formylethyl)-3β-hydroxy-5-oxo-1β-cyclopentaneheptanoic acid methyl ester, δ-lactone, 5-cyclicethylene acetal 210 Mg. of 50% sodium hydride dispersion is added to a stirred solution of 1.36 g. of (±) 2α-(2-carboxyethyl)-3β-hydroxy-5-oxo-1β-cyclopentaneheptanoic acid methyl ester, δ-lactone, 5-cyclicethylene acetal in 25 ml. of methyl formate under a nitrogen atmosphere over a period of 3 minutes at 0°C. The reaction mixture is stirred for 1 hour at 0°C. and 4 hours at 20°C. The solvent is removed in vacuo and the residue triturated with ether and the precipitate filtered and washed with ether. The precipitate is dissolved in cold saturated aqueous sodium dihydrogen phosphate, extracted with ethyl acetate, dried over sodium sulfate and evaporated to dryness. The residue is crystallized from ether-hexane affording (±)-2α-(2-carboxy-2-formylethyl)-3β-hydroxy-5-oxo-1β-cyclopentaneheptanoic acid methyl ester, δ-lactone, 5-cyclicethylene acetal, m.p. 88°–90°C.

When in the above procedure optically active 2α-(2-carboxyethyl)-3β-hydroxy-5-oxo-1β-cyclopentanehaptanoic acid methyl ester, δ-lactone, 5-cyclicethylene acetal of the natural series is employed in place of the racemic mixture, there is obtained optically active 2α-(2-carboxy-2-formylethyl)-3β-hydroxy-5-oxo-1β-cyclopentaneheptanoic acid methyl ester, δ-lactone, 5-cyclicethylene acetal, of the natural series, m.p. 80°–81°.

PREPARATION 22

2α-(2-Acetoxy-2-carboxyvinyl)-3β-hydroxy-5-oxo-1β-cyclopentaneheptanoic acid methyl ester, δ-lactone, 5-cyclicethylene acetal A.  2α-(2-Carboxy-2-oxoethyl)-3β-hydroxy-5-oxo-1β-cyclopentaneheptanoic acid methyl ester, δ-lactone, 5-cyclicethylene acetal A solution of 460 mg. of (±)-2α-(2-carboxy-2-formylethyl)-3β-hydroxy-5-oxo-1β-cyclopentaneheptanoic acid methyl ester, δ-lactone, 5-cyclicethylene acetal in 6 ml. of methylene chloride and 4.4 ml. of pyridine is cooled to −70°C. and treated with a 5% ozone-oxygen mixture until as excess of ozone is present as indicated by a persistent pale blue color. the excess ozone is evaporated by bubbling nitrogen into the reaction and the solvents are removed in vacuo. The residue is triturated with ether affording crystalline (±)- 2α-(2-carboxy-2-oxoethyl)-3β-hydroxy-5-oxo-1β-cyclopentaneheptanoic acid methyl ester, δ-lactone, 5-cyclicethylene acetal, m.p. 114°–116°C.

B.  2α-(2-Acetoxy-2-carboxyvinyl)-3β-hydroxy-5-oxo-1β-cyclopentaneheptanoic acid methyl ester, δ-lactone, 5-cyclicethylene acetal The ozonolysis product is acetylated in 6 ml. of pyridine and 3 ml. of acetic anhydride at room temperature for 17 hours. 6 Ml. of xylene is added and the reaction mixture evaporated to dryness in vacuo. The residue is triturated with ether-hexane affording crystalline (±)-2c-(2-acetoxy-2-carboxyvinyl)-3β-hydroxy-5-oxo-1β-cyclopentaneheptanoic acid methyl ester, δ-lactone, 5-cyclicethylene acetal m.p. 82°–84°C.

When in the above procedure optically active 2α-(2-carboxy-2-formylethyl)-3β-hydroxy-5-oxo-1β-cyclopentaneheptanoic acid methyl ester, δ-lactone, 5-cyclicethylene acetal is employed in place of the racemic mixture, there is obtained (±)-2α-(2-acetoxy-2-carboxyvinyl)-3β-hydroxy-5-oxo-1β-cyclopentaneheptanoic acid methyl ester, δ-lactone, 5-cyclicethylene acetal $[\alpha]_D$ CHCl$_3$ +30° of the natural series.

PREPARATION 23

2α-Formyl-3β-[(methoxalyl)oxy]-5-oxo-1β-cyclopentaneheptanoic acid methyl ester, 5-cyclicethylene acetal 14 Mg. of osimium tetroxide in 1.4 ml. of methanol is added to a stirred solution of 430 mg. of (±)-2α-(2-acetoxy-2-carboxyvinyl)-3β-hydroxy-5-oxo-1β-cyclopentaneheptanoic acid methyl ester, δ-lactone, 5-cyclicethylene acetal in 16 ml. of methanol. The reaction mixture darkens in 10–15 minutes and 440 mg. of powdered sodium periodate is added portionwise over 3 hours. The reaction mixture is stirred for 1 additional hour, filtered, and the filtrate evaporated to dryness in vacuo. The residue is dissolved in 2.5 ml. of 1:1 ethyl acetate-benzene and the solution washed with water and saturated aqueous sodium chloride. The organic layer is dried over sodium sulfate and evaporated to dryness in vacuo affording (±)-2α-formyl-3β-[(methoxalyl)oxy]-5-oxo-1β-cyclopentaneheptanoic acid methyl ester, 5-cyclicethylene acetal as an oil.

When in the above procedure (+)-2α-(2-acetoxy-2-carboxyvinyl-3β-hydroxy-5-oxo-1β-cyclopentaneheptanoic acid methyl ester,δ-lactone, 5-cyclicethylene acetal is employed in place of the raceemic mixture, there is obtained optically active 2α-formyl-3β-[(methoxyalyl)oxy]-5-oxo-1β-cyclopentaneheptanoic acid methyl ester, 5-cyclicethylene acetal, of the natural series.

PREPARATION 24

3β-Hydroxy-2α-(3-oxo-1-octenyl)-5-oxo-1β-cyclopentaneheptanoic acid methyl ester, 5-cyclicethylene acetal A. 3β-[(Methoxyalyl)oxy]-2α-(3-oxo-1-octenyl)-5-oxo-1β-cyclopentaneheptanoic acid methyl ester, 5-cyclicethylene acetal 230 Mg. of dimethyl-2-oxoheptayl phosphonate in 4 ml. of tetrahydrofuran is added to a stirred suspension of 50 mg. of 50% sodium hydride dispersion in 10 ml. of tetrahydrofuran under a nitrogen atmosphere at 0°C. The reaction mixture is stirred at 0°C. for 30 minutes and a solution of 420 mg. of (±)-2α-formyl-3β-[(methoxalyl)-oxy]-5-oxo-1β-cyclopeentaneheptanoic acid methyl ester, 5-cyclicethylene acetal in 4 ml. of tetrahydrofuran is added dropwise over 5 minutes. After 10 minutes the mixture is allowed to warm to room temperature and stirred for 2 hours. The reaction is cooled to 10°C., added to cold saturated aqueous sodium dihydrogen phosphate and extracted with ethyl acetate. The organic extract is washed wit saturated aqueous sodium chloride, stirred over sodium sulfate, and evaporated to dryness in vacuo affording (±)-3β-[(methoxalyl) oxy]-2α-(3-oxo-1-octenyl)-5-oxo-1β-cyclopentaneheptanoic acid methyl ester, 5-cyclicethylene acetal containing a smaller amount of (±)-3β-hydroxy-2α-(3-oxo-1-octenyl)-5-oxo-1β-cyclopentaneheptanoic acid methyl ester, 5-cyclicethylene acetal.

B. 3β-Hydroxy-2α-(3-oxo-1-octenyl)-5-oxo-1β-cyclopentaneheptanoic acid methyl ester, 5-cyclicethylene acetal The above mixture is dissolved in 7.5 ml. of methanol and 60 mg. of ethylenediamine in 5 ml. of methanol added dropwise at 0°C. The reaction mixture is stirred for 45 minutes at 20°C. and the solvent removed in vacuo. The residue is partitioned between ethyl acetate and saturated aqueous sodium dihydrogen phosphate. The layers are separated and the aqueous layer extracted with ethyl acetate. The combined extracts are dried and evaporated to dryness in vacuo. The residue is chromatographed on 35 g. silical gel eluting with 30% acetone and chloroform taking 40 fractions of 4 ml. each. Fractions 5–14 are combined and evaporated to dryness in vacuo affording 250 mg. of pure (±)-3β-hydroxy-2α-(3-oxo-1-octenyl)-5-oxo-1β-cyclopentaneheptanoic acid methyl ester, 5-cyclicethylene acetal,λmax., (methanol)= 232 nm (E 12,500).

When in the above procedure, optically active 3β-[(methoxyalyl)oxy]-5-oxo-1β-cyclopentaneheptanoic acid methyl ester, 5-cyclicethylene acetal of the natural series is employed in place of the racemic mixture, there is obtained optically active (3β-hydroxy-2α-(3-oxo-1-octenyl)-5-oxo-1β-cyclopentaneheptanoic acid methyl ester, 5-cyclicethylene acetal.

PREPARATION 25

Resolution of 3α-methyl-4-cyclohexene-1α,2α-dicarboxylic acid-1-methyl ester 4.98 G. (0.03 moles) of (±) 3α-methyl-4-cyclohexene-1α,2α-dicarboxylic anhydride is dissolved in 100 ml. of anhydrous methanol and cooled to 0°C. The reaction mixture is treated with 20 ml. of 1.35N sodium methoxide in methanol. The methanol is evaporated in vacuo, the residue is acidified with sodium dihydrogen phosphate, and the (±) 3α-methyl-4-cyclohexene-1α,2α-dicarboxylic acid 1-methyl ester extracted with ether, dried, evaporated, and recrystallized from ether yielding 3.15 g. m.p. 110°–112°C. The acid ester is resolved by treating 0.594 g. (0.003 moles) in 10 ml. of ether with 0.856 g. of (+) dehydroabietylamine in 10 ml. of ether. The precipitated solid is recrystallized from acetone affording 0.53 g. of a salt m.p. 163°–165°C. The salt is converted to the free acid by extracting a suspension of the salt in ether/ethyl acetate with aqueous sodium bicarbonate. The aqueous solution of the sodium salt of the acid is treated with sodium dihydrogen phosphate precipitating the free acid. The solid material is dried affording (−) 3α-methyl-4-cyclohexene-1α,2α-dicarboxylic acid -1-monomethyl ester m.p. 60°–61°C. [α]$_D$ CHCl$_3$ −69°.

The mother liquor of the initially precipitated salt is concentrated causing the additional precipitation of a salt m.p. 143°–145°C. which on treatment above afforded (+) 3α-methyl-4-cyclohexene-1α,2α-dicarboxylic acid 1-monomethyl ester [α]$_D$ CHCl$_3$ +67.7°.

The above acid ester is reduced following the procedure of Preparation 1 affording 3α-methyl-4-cyclohexene 1α,2α-dimethanol is optically active form.

PREPARATION 26

Resolution of 4α-hydroxy-3α-methyl-1α,2α-cyclohexanediacetic acid δ-lactone 53.95 G. of (+) 4α-hydroxy-3α-methyl-1α,2α-cyclohexanediacetic acid δ-lactone is dissolved in the minimum amount of chloroform (150 ml.) and a solution of 79 g. of (+) dehydroabietylamine in 300 ml. of benzene is added. Crystallization occurs overnight yielding 59.94 g. of fine crystals m.p. 158°–167°C. Partial concentration of the mother liquor and dilution with ether yields a second crop of 26.7 g. of crystals m.p. 144°–148°C. Recrystallization of the second crop of crystals from methanol/ether affords 20.1 g. of fine crystals m.p. 148°–150°C. The recrystallized salt is suspended in ethyl acetate and extracted with aqueous potassium bicarbonate solution. The aqueous extract is washed with ether, acidified with 2.5N hydrochloric acid, saturated with sodium chloride, and the free optically active 4α-hydroxy-3α-methyl-1α,2α-cyclohexanediacetic acid δ-lactone is extracted with ethyl acetate. The extracts are washed with a saturated sodium chloride solution, dried over magnesium sulfate, and evaporated to dryness, affording of crystalline (−) 4αhydroxy-3α-methyl-1α,2α-cyclohexanediacetic acid, δ-lactone m.p. 118°–120.5°C. [α]$_D$ CHCl$_3$ −54.7°.

The first crop of salt crystals may also be recryltalized affording 37.77 g. of crystals m.p. 169°-170.5°C. This salt is treated in a similar manner as above affording (+) 4α-hydroxy-3α-methyl-1α,2α- cyclohexanediacetic acid, δ-lactone m.p. 118°–120.5°C. [α]$_D$ CHCl$_3$ +55°.

The final product of this invention, 3β-hydroxy-2α-(3α-hydroxy-1-octenyl)-5-oxo11β-cyclopentaneheptanoic acid methyl ester, 5-cyclicethylene acetal can be converted into Prostaglandin E$_1$ by the following preparative steps, numbered 27 and 28.

PREPARATION 27

Prostaglandin E$_1$, cyclicethylene acetal.
[3β-Hydroxy-2α-(3[S]hydroxy-1-octenyl-5-oxo-1β-cyclopentaneheptanoic acid, 5-cyclicethylene acetal]

A solution of 45 mg. of potassium hydroxide in 2.5 ml. of water at 0°C. is added dropwise to a solution of 40 mg. of (±)-3β-hydroxy-2α-(3[S]hydroxy-1-octenyl)-5-oxo-1β-cyclopentaneheptanoic acid methyl ester, 5-cyclicethylene acetal in 1 ml. of methanol at 0°C. in a nitrogen atmosphere. The reaction mixture is allowed to warm to room temperature and stirred for 3 hours. Cold dilute aqueous potassium bicarbonate is added to the reaction mixture and the mixture extracted with hexane. Solid sodium dihydrogen phosphate is added to the aqueous layer and the latter is extracted with 1:1 ethyl acetate-benzene. The organic layer is dried over sodium sulfate and evaporated to dryness in vacuo affording (±)-prostaglandin E$_1$, 5-cyclicethylene acetal [(±)-3β-hydroxy-2α-(3[S]-hydroxy-1-octenyl)-5-oxo-1β-cyclopentaneheptanoic acid, 5-cyclicethylene acetal] m.p. 82°–84°C.

When in the above procedure optically active 3β-hydroxy-2α-(3[S]hydroxy-1-octenyl)-5-oxo-1β-cyclopentaneheptanoic acid methyl ester, 5-cyclicethylene acetal of the natural series is employed in place of the racemic mixture there is obtained optically active prostaglandin E$_1$, 5-cyclicethylene acetal of the natural series, m.p. 81°–83°C.

PREPARATION 28

Prostaglandin E$_1$

A mixture of 37 mg. of (±)-prostaglandin E$_1$, 5-cyclicethylene acetal and 3 ml. of 1:1 acetic acid-water it stirred at 25°C. for 3 hours. Saturated aqueous sodium hydrogen phosphate solution is added and the reaction mixture extracted with 1:1 ethyl acetate-benzene. The organic layer is washed with saturated aqueous sodium chloride, dried over sodium sulfate and evapoarted to dryness in vacuo affording a crystalline residue which is recrystallized from ethyl acetate-benzene affording (±)-prostaglandin E$_1$, m.p. 111°–113°C.

When in the above procedure optically active prostaglandin E$_1$, cyclicethylene acetal of the natural series is employed in place of the racemic mixture, there is obtained (−)-prostaglandin E$_1$, m.p. 112°–113°C., [α]$_C$ THF −58°.

What is claimed is:

1. A loweralkyl ester of 3β-2α-(3-oxo-1-octenyl)-5-oxo-1β-cyclopentaneheptanoic acid, 5-cyclic ethylene acetal or a stereoisomer thereof.
2. The compound of claim 1 in which the loweralkyl is methyl.
3. A loweralkyl of 3β-2α-(3α-hydroxy-1-octenyl)-5-oxo-1β-cyclopentaneheptanoic acid, 5-cyclic ethylene acetal or a stereoisomer thereof.
4. The compound of claim 3 in which the loweralkyl is methyl.
5. The compound of claim 1 which is 3β-(trimethylsilyloxy)-2α-(3-oxo-1-octenyl)-5-oxo-1β-cyclopentaneheptanoic acid methyl ester, 5-cyclic ethylene acetal.

* * * * *

UNITED STATES PATENT OFFICE
CERTIFICATE OF CORRECTION

Patent No. 3,890,351      Dated June 17, 1975

Inventor(s) David Taub

It is certified that error appears in the above-identified patent and that said Letters Patent are hereby corrected as shown below:

Column 18, Line 22, in Claim 1, after " 3β- " add -- [tri(loweralkyl)silyloxy]- --.

Column 18, Line 27, in Claim 3, after " loweralkyl " add -- ester -- and after " 3β-" add -- [tri(loweralkyl)silyloxy]- --.

Signed and Sealed this second Day of September 1975

[SEAL]

Attest:

RUTH C. MASON
Attesting Officer

C. MARSHALL DANN
Commissioner of Patents and Trademarks